Dec. 23, 1952 H. W. LINDSAY 2,622,813
ALIGNING MECHANISM FOR TAPE RECORDERS
Filed March 21, 1949
Fig. 1.
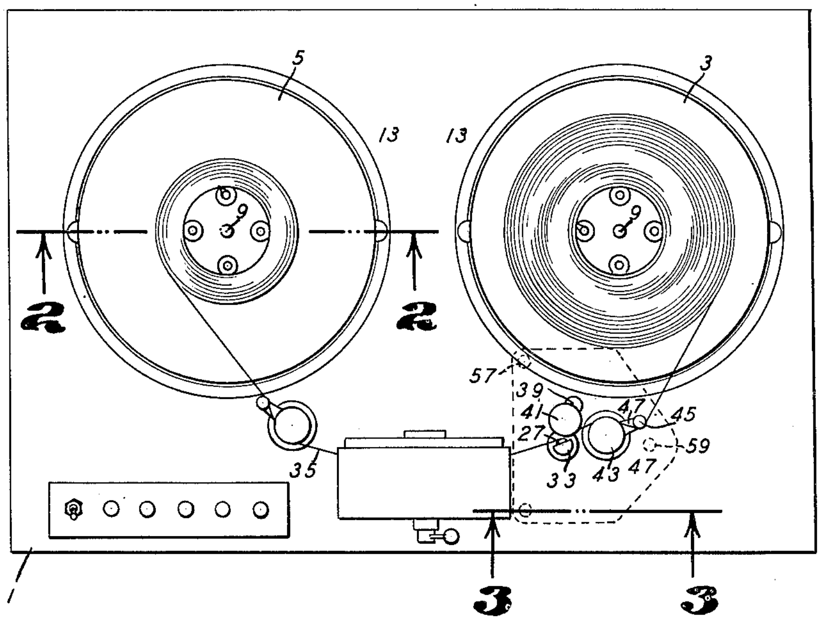
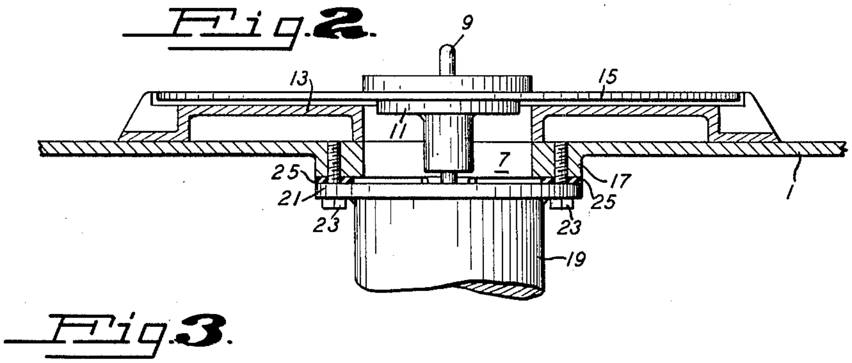
Fig. 3.
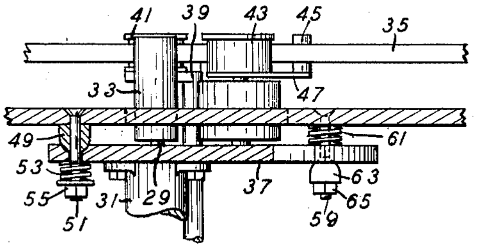
INVENTOR.
HAROLD W. LINDSAY
BY Donald K. Lippincott
ATTORNEY.

Patented Dec. 23, 1952

2,622,813

UNITED STATES PATENT OFFICE 2,622,813

ALIGNING MECHANISM FOR TAPE RECORDERS

Harold W. Lindsay, Redwood City, Calif., assignor to Ampex Electric Corporation, San Carlos, Calif., a corporation of California Application March 21, 1949, Serial No. 82,692

4 Claims. (Cl. 242—55)

This invention relates to mechanisms for feeding a tape through a device such as a sound recorder, reproducer, or the like.

The tapes used in mechanisms of the character referred to are customarily not more than two or three thousandths of an inch thick and not more than about a quarter of an inch wide. They are composed either of paper or, preferably, of a plastic such as reconstructed cellulose or cellulose acetate. They are flexible and elastic, but they may be stretched so as to take a permanent set if they are not handled properly. In the normal process of recording a tape travels through the recording or reproducing heads at a speed of about two feet per second, and since one of the advantages of tape recording is that an hour or more may be recorded without interruption, the length of tape involved on a single reel may be a mile and a half, or even more.

The speed of the tape as it passes through the recording head must be a constant. The diameter of the rolls of tape varies as it passes from the pay-off reel to the take-up reel, and therefore the drive must be applied to the tape itself. Since the tape must be snugly wound on the reels provision must be made for their rotation at a velocity which varies as the reel fills up or empties. One method of accomplishing this is to provide a drive which would normally cause the take-up reel to rotate a little bit more rapidly than would be necessary to pass the tape through the heads at the required speed, and to provide means in the reel drive mechanism, such as a slipping clutch or belt, which permits the reel speed to be held down to the necessary value. These slipping drives incline to be jerky, however, and therefore in the highest grade equipment it is better to provide take-up and pay-off motors which are provided with sufficient power to permit them to take up the slack but not sufficient to pull the tapes through the heads. Such electrical slip mechanisms are very much more uniform in operation than those wherein the slip is mechanical.

Under these circumstances it is necessary that the pay-off and take-up reels be accurately coplanar and that the shafts upon which they rotate be strictly parallel. It is further necessary that the capstan or other driving mechanism which determines the actual tape speed shall also have its axis accurately parallel to the reel shafts, because even a slight angularity will cause the tape to "crawl" and instead of reeling smoothly it will eventually slip off of the roll and become a hopeless tangle.

Alignment of the accuracy required is not easy to achieve in apparatus of this character. The size of the reels used requires that they be mounted on a table top of considerable area. It is not feasible to make such table tops or mounting plates unduly massive, since a certain degree of movability in the equipment is always desirable and frequently necessary. If the mounting plate be made of any of the lighter materials the very machining of the materials which would permit rigidly parallel mountings tends to set up stresses which, in relieving themselves, would tend to throw the shafts out of line. Normalizing by heat treatment may minimize this, but it also is likely to be accompanied by some warping.

The broad purpose of my invention is to provide a film drive aligning mechanism which may be mounted on an ordinarily stable mounting plate or table top and which will permit the adjustment of the reels so that they are coplanar and the shafts and drive mechanism are parallel in spite of deviations of the mounting plate. To this end, among the objects of the invention are to provide means whereby one of the shafts may be taken as a standard and the others quickly and accurately aligned therewith, and to provide an aligning or leveling mechanism which is inherently stable and is resistant to shock, vibration, and the other normal hazards of commercial operation.

The nature of the invention may best be understood by reference to the accompanying drawings, wherein Fig. 1 is a plan view of the mechanism of my invention, and Figs. 2 and 3 are fragmentary sectional views, the planes of section being indicated by the correspondingly numbered lines in Fig. 1.

Referring first to Fig. 1 the mounting plate or table top 1 which carries all of the remainder of the equipment is formed in the present instance of an aluminum casting of relatively thin cross section, but other materials may be used such as plywood, either by itself or faced with plastic or metal. The mounting plate carries mounts for a take-up reel 3 and a pay-off reel 5, the plate 1 being apertured, as shown at the reference character 7 of Fig. 2 to pass the shaft 9 and flange 11 carrying the respective reels. Each of the reel mounts is preferably surrounded by a frusto-conical pedestal 13, the top of which is recessed to carry the flange 15 of the reel.

In the case of each reel mount the aperture 7 is surrounded by an annular boss 17 upon which the reel drive is mounted. The upper surface of the mounting plate 1 and the lower face of the flange 17 are finished to approximate parallelism, but because of the nature of the mountings next to be described it is unnecessary to take any extreme precautions in this surfacing.

In the equipment here shown as the preferred embodiment of my invention, the means utilized for tensioning the tape are motors, as indicated by the reference character 19. A motor is provided for each of the reels 3 and 5, and they are so connected electrically as to tend to rotate the reels in opposite directions. Normally these motors are under-excited, so that no damage is done when they are stalled or rotated in the direction opposite to that in which they would turn by virtue of their electrical excitation. They are preferably so arranged, however, that one or the other may be fully excited for the purpose of quickly rewinding the tape, or for running it rapidly forward to pick up a selected portion of a recording.

Each motor is provided with a flange 21 (or with equivalent ears), drilled at 90° intervals to pass supporting screws 23, which are threaded into the annular boss 17. Between the flange 21 and the boss 17, however, there are inserted resilient washers 25, preferably of synthetic rubber, although the natural material or even metallic springs may be used instead. The screws 23 are tightened so that all four of the washers are under some degree of compression. Preferably the screws 23 are positioned on the line through the centers of the shaft 9, and at right angles thereto, respectively, but this is primarily a matter of convenience and is not strictly necessary.

In adjusting the device tape reels are put on each of the two reel mounts, the tape being properly wound and distributed between the two reels. With the tape passing straight between them, but not stretched tight, any failure in parallelism between the two shafts at once becomes evident by a buckling of the tape. Such buckling can be corrected by tightening or loosening the screws 23 of one or both of the reel mounts in precisely the same way that a surveyor's transit is levelled, the washers 25 being sufficiently compressible to take care of a considerable degree of tilt. The buckling of the tape occurs only in the case of tilting of the shafts 9 toward or away from each other; lack of parallelism transverse to their center line is indicated by twisting of the tape, and this can be adjusted in the same way as the tilt in the common plane of the axes. The final adjustment can be made by reeling the tape from one reel to the other, and correcting any tendency of the tape to "creep" when it is reeled in either direction.

The compressibility of the washers 25 also permits of compensating for and adjusting small differences in level. Larger differences can be corrected by sliding the flange 11 along the shaft. Taking this adjustment into account, it is possible to make all the necessary adjustments on a single one of the reel mounts, mounting the other reel rigidly to the mounting plate without the interposition of the resilient washers. In general, however, I prefer to mount both reels in the same manner, since this gives approximately twice the latitude of adjustment.

Even more important, however, than the alignment of the reels is that of the drive capstan. The capstan 27 (Fig. 1) is an accurately ground steel cylinder mounted on the shaft 29 of a synchronous motor which is not itself shown, but a portion of the mounting of which is indicated by the reference character 31. The capstan is protected from accidental contacts by a partially cylindrical shield 33 which surrounds it except on the side which contacts the tape 35. The synchronous motor carrying the capstan is rigidly secured to a base plate 37. Also mounted on this base plate is a crank arm 39 carrying an idler roller 41. The crank arm is spring actuated to force the idler roller against the tape and thus bring the latter into firm contact with the capstan. From the roller 41 the tape passes over a second idler 43, mounted on a fixed axis, and thence under a roller or pin 45 mounted on a spring actuated tensioning arm 47. The function of this latter tensioning arm is primarily to keep the tape taut at all times, and still to permit a slight loop to form in it which will take up gradually when the machine is started and prevent breakage of the tape due to too sudden starting.

As above stated, the capstan shaft, idlers, and tension arm all rotate on axes which are fixed in relation to the base plate, and these axes should all be parallel. It is not difficult to maintain them so, as the base plate is small enough and rigid enough so that it may be machined flat without the probability of any serious warping. Very slight deviations from parallelism are not, however, too important, since it is only the capstan which drives the tape which exerts forces upon it which might tend to make it creep, and if the capstan axis is parallel to the reel shafts the apparatus will operate properly. Parallelism can be secured by virtue of the mounting of the base plate.

The mounting mentioned comprises a stud 49 which fits over a screw or bolt 51 passing through the mounting plate 1 and through a loose clearance hole in the base plate 37. The stud has a spherical end which nests into a corresponding countersink in the base plate. The stud and its countersunken nest are held firmly in contact by a stiff compression spring 53 surrounding the screw 51 and held in place by a nut and washer 55.

The stud and spring mounting just described supports one corner only of the base plate. The complete support for this plate comprises two additional screws 57 and 59 which are preferably spaced as though at the corners of an approximately equilateral triangle. A compression spring 61 surrounds each of these latter screws between the base plate 37 and the mounting plate 1, tending to force the two apart. A spherical ended thimble 63 and nut 65 prevent this, the thimble nesting into a corresponding countersink on the lower side of the base plate.

This form of mounting makes the angle of the capstan and its shaft completely adjustable within the limits of compression of the springs 61. The position of the corner of the mounting plate through which passes the screw 51, and its distance from the mounting plate 1, are completely fixed by the length of the stud 49. The base plate can, however, rock in either direction around this corner as a center, and by tightening the nut 65 on the screw 59, or the corresponding nut on the screw 57, the axis of the capstan can quickly be brought into parallelism with the axes of the shaft 9. Owing to the three-point suspension these nuts can be individually adjusted without in the least affecting the stability of the mounting.

I claim:

1. Mechanism for feeding a tape through a magnetic sound-recorder or the like comprising a mounting plate, a take-up reel mount and a pay-off reel mount each comprising a rotatable shaft substantially perpendicular to said plate, means on said mounts for rendering said shafts parallel comprising a flange on at least one of said mounts, a plurality of screws passing through said flange and threaded into said plate and resilient washers interposed between said flange and plate, and drive mechanism interposed in the path of a tape passing between said reels, said drive mechanism comprising a base-plate having a drive capstan and an idler for forcing said tape against the capstan mounted thereon, and means for securing said base plate to said mounting plate comprising a ball-ended stud interposed between said base- and mounting-plates and resting in a cavity in one of the said plates, resilient means for retaining said stud and cavity in contact, a pair of spaced springs also interposed between said plates, and screws passing through said plates and springs for compressing the latter to the degree necessary to render the axis of said capstan parallel with said shafts.

2. Mechanism in accordance with claim 1 wherein said reel-mounts and drive mechanism are secured to the under side of said mounting plate, with said shafts and capstan projecting through apertures therein.

3. Mechanism for feeding a tape through a magnetic sound-recorder or the like comprising a mounting plate, a take-up reel mount and a pay-off reel mount, means for securing said reel mounts to said mounting plate including resilient elements interposed between said mounting plate and at least one of said reel mounts and means for adjustably compressing said resilient elements to tilt said mount with respect to said mounting plate, a separate base plate, a drive mechanism secured to said base plate, a rigid positioning member interposed between said mounting plate and one point on said base plate, compressible positioning members interposed between said mounting plate and at least two other points on said base plate, and means for adjustably forcing said base plate against said compressible positioning means.

4. Mechanism for feeding a tape through a magnetic sound recorder or the like comprising a mounting plate; a take-up reel mount and a pay-off reel mount each comprising a rotatable shaft supported from the said mounting plate and substantially perpendicular thereto; means on at least one of the mounts for rendering the shaft thereof parallel to the shaft of the other mount; a drive mechanism interposed in the path of a tape adapted to pass between said reels; said drive mechanism comprising a base plate having a drive capstan and an idler for forcing a tape passed between the said two mounts against the capstan; means for resiliently securing the base plate to the mounting plate; and resilient means for adjusting the axis of the capstan to bring it into substantial parallelism with the axes of the reel shafts.

HAROLD W. LINDSAY.

REFERENCES CITED

The following references are of record in the file of this patent:

UNITED STATES PATENTS

| Number | Name | Date |
|---|---|---|
| 1,103,778 | Kendall | July 14, 1914 |
| 2,097,071 | Lichten | Oct. 26, 1937 |
| 2,262,731 | Gruber et al. | Nov. 11, 1941 |
| 2,496,228 | Palmer et al. | Jan. 31, 1950 |
| 2,504,587 | Rey | Apr. 18, 1950 |